United States Patent [19]

Lorento et al.

[11] Patent Number: 5,065,508
[45] Date of Patent: Nov. 19, 1991

[54] TWO-PIECE PISTON AND METHOD OF MANUFACTURING THE SAME

[75] Inventors: Gustavo F. Lorento; José A. C. Mendes, both of São Paulo, Brazil; João A. D. Cullen, Ann Arbor, Mich.

[73] Assignee: Metal Leve S.A. Industria E Comercio, São Paulo, Brazil

[21] Appl. No.: 423,119

[22] Filed: Oct. 19, 1989

[30] Foreign Application Priority Data

Oct. 26, 1988 [BR] Brazil ................................ 8805716

[51] Int. Cl.⁵ ............................................. B23P 15/10
[52] U.S. Cl. ........................... 29/888.042; 29/888.044; 92/208; 92/222; 92/231
[58] Field of Search .................... 29/888.04, 888.042, 29/888.043, 888.044, 888.05, 888.045; 92/222, 224, 231, 208

[56] References Cited

U.S. PATENT DOCUMENTS

| | | | |
|---|---|---|---|
| 1,061,922 | 5/1913 | Patrick | 29/888.042 |
| 1,233,726 | 7/1917 | Talbot | 29/888.05 X |
| 1,377,453 | 5/1921 | Bandle | 92/222 |
| 3,152,523 | 10/1964 | Whitfield et al. | 92/224 X |

FOREIGN PATENT DOCUMENTS 160790 12/1921 United Kingdom ........... 29/888.042

*Primary Examiner*—Joseph M. Gorski
*Attorney, Agent, or Firm*—Darby & Darby

[57] ABSTRACT

A method for the manufacture of a two-piece piston wherein the top portion and the pin boss portion, which define the piston head, are fabricated separately by cold or hot forming, casting or sintering, and joined together by welding such as, for instance, friction welding. The top portion and the pin boss portion may be of the same material or different materials, and obtained by the same method or by different methods.

9 Claims, 2 Drawing Sheets

TWO-PIECE PISTON AND METHOD OF MANUFACTURING THE SAME

The present invention relates to a two-piece, or articulated, piston for internal combustion engines, more specifically diesel engines. More particularly, the present invention relates to a method for the manufacture of the head portion of a two-piece piston and the piston thus obtained. In the two-piece, or articulated, piston the upper portion, or head, and the lower portion, or skirt, are independent members. The skirt is mounted by means of a wrist pin on a pair of bosses located at the lower end of members pendent from and integral with the head. A clearance is provided between the head lower end and the skirt upper end in such a manner that, with the piston in operation in the engine, there is no contact between the head and the skirt. Generally, the head is made from cast or forged steel, and the skirt is made from aluminum or an aluminum alloy. One such piston is disclosed and illustrated in a number of patents such as the U.S. Pat. No. 4,161,165 of July 17, 1979, U.S. Pat. No. 4,180,027 of Dec. 25, 1979, and U.S. Pat. No. 4,256,022 of Mar. 17, 1981. The use of two-piece, or articulated, pistons is particularly advantageous in diesel engines, especially diesel engines where thermal and mechanical loads are very high. In these engines the pressure and temperature of combustion gases are extremely high, thereby subjecting the piston top to high mechanical and thermal stresses. The use of conventional aluminum pistons for these engines is possible only with the use of reinforcing inserts on the combustion chamber and top compression ring groove, which are the most heavily loaded portions. Nonetheless, for certain applications such solutions are not entirely satisfactory, besides the fact that these inserts increase the cost of the piston. Thus, the two-piece piston, which head portion is generally made of a material resistant to high thermal or mechanical loads such as steel or cast iron, are an adequate solution for such problems, besides providing other benefits. The ring band can be mounted with a reduced piston-to-cylinder liner clearance due to a small transverse motion of the piston, thereby improving the piston ring stability and, accordingly, affording a lower lubricating oil consumption and blow-by. On the other hand, the absence of a contact between the head and the skirt portions prevents the heat from the head from flowing to the skirt, which affords mounting the skirt in the cylinder liner with minimum clearances, thereby reducing the level of engine noise. Owing to the processes and materials usually employed for making two-piece pistons, especially the top, or head, portion comprising a top and a pin boss portion, the final cost of these pistons is somewhat high to the extent of not justifying its use for light duty diesel engines. With a view to making use of the advantageous constructive characteristics of two-piece pistons also for light duty diesel engines without the cost drawback attending such type of piston, applicant developed a simple and inexpensive manufacturing process which affords a final product embodying the main advantageous features of the two-piece pistons made according to the methods employed heretofore. Therefore, it is a principal object of the present invention to provide a method wherein the members composing the upper portion, i.e., the top portion and the pin boss portion, of a two-piece piston, made either from the same material or different materials, are manufactured as separate parts and subsequently joined together by welding.

It is a further object of the present invention to provide a two-piece, or articulated, piston having its upper portion, or head, composed of a top portion and a pin boss portion made as separate parts and subsequently joined together.

A preferred and exemplary embodiment of the present invention will be hereinafter described with reference to the accompanying drawings where:

Figure 1:
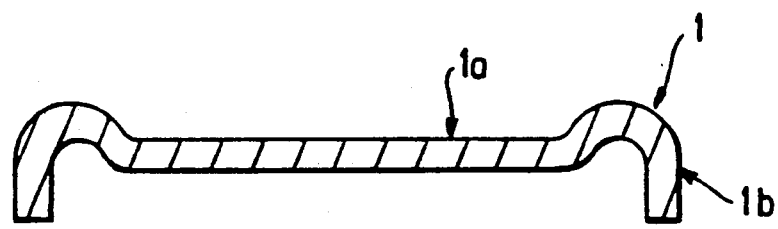
FIG. 1 is a schematic longitudinal sectional view of the piston top portion made according to the method of the invention.

In a preferred embodiment, the top portion 1 is obtained by deep drawing of a thick sheet, preferably a steel sheet, having a suitable thickness (FIG. 1).

According to the invention, the top portion 1 is represented by an upper plate 1a and a peripheral and substantially cylindrical depending leg 1b which will accommodate peripheral grooves for the piston rings.

Figure 2:
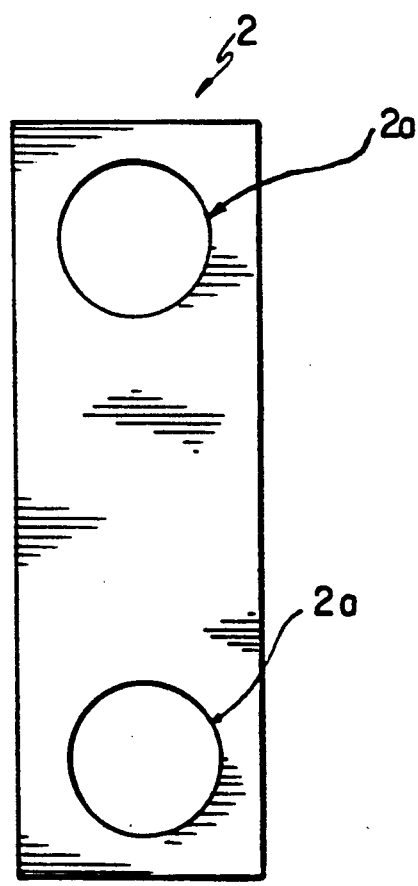
FIG. 2 is a schematic plain view of a plate cut and provided with two holes, representing the blank for the pin boss portion of the piston according to the invention.
Figure 3:
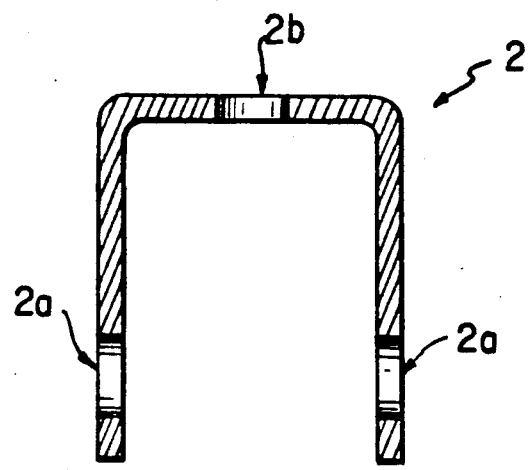
FIG. 3 is a schematic longitudinal sectional view of the pin boss portion of the piston according to the present invention.
Figure 4:
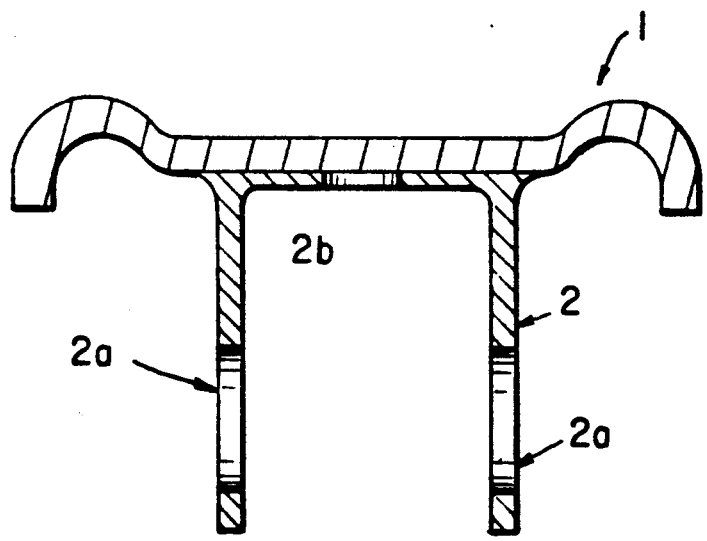
FIG. 4 is a longitudinal sectional view of the top portion and pin boss portion joined together according to the method of the invention.

The pin boss portion 2 is also made from a metal sheet, preferably steel sheet. The initial operation comprises cutting the sheet to the desired shape, and punching the holes 2a for the wrist pin, as shown in FIG. 2. The cut out and punched plate is then submitted to a bending operation to an approximate U-shaped and an additional hole 2b is provided as shown in FIG. 3. Thereafter, the two parts, i.e., the top portion 1 and the pin boss portion 2, are joined together by welding, thereby making up the assembly shown in FIG. 4. The hole 2b on the base of the U of pin boss portion 2, which is the region to be joined to the top portion, is intended to reduce weight of the boss portion without impairing the resistance of the weld of the top and boss portions. Thus, in addition to the desired decrease in weight of the top and pin boss assembly, the removal of material from the central portion of the base of the U underneath the top portion central regions provides a larger room for the connecting rod small and, needed in designs where the pin bosses are closer to the top portion, thus preventing the connecting rod from interfering with the top portion. In the final manufacturing step of the top and boss assembly, the pin boss holes 2a are machined for a perfect hole alignment, and the top is provided with circumferential grooves for the piston rings. As such grooves are not an important aspect in the invention, same are not shown in the drawings.

The top and pin boss assembly made according to the present invention has excellent mechanical properties and geometric accuracy. In addition, the sheet formation method, which is the preferred method for fabricating the top and pin boss portions separately, is a reproducible system which provides good dimensional accuracy and little machining, which makes it substantially less expensive than the methods usually employed for manufacturing these components. However, in addition to the deep drawing method other processes, such as casting, forging or sintering, may be used to obtain the top and pin boss portions. Although more costly than the forming method, such processes are quite appropriate for making these components. On the other hand, according to the method of the present invention, the members to be welded together can be of the same material or different materials. Thus, a steel top member can be welded to a steel, cast iron or aluminum pin boss member; a cast iron top member cam be welded to a cast iron, steel or aluminum pin boss member; an aluminum top member can be welded to an aluminum, steel or cast iron pin boss member. Likewise, the method is applicable for joining by welding top and pin boss portions made by the same process or different processes. Thus, a stamped top member can be welded to a stamped, cast, forged or sintered pin boss member; a cast top member can be welded to a cast, forged, sintered or stamped pin boss member; a forged top member can be welded to a forged, cast, stamped or sintered pin boss member; and a sintered top member can be welded to a sintered, cast, stamped or forged pin boss member.

A preferred method for joining the top and pin boss portions is friction welding, which performs the desired joining without causing a fusion of the materials of any of the members to be welded, thereby preventing changes to the structure of the materials of these components. However, other methods can be employed for carrying out the joining, such as metal inert gas welding, tungsten inert gas welding, fusion welding, electric welding, or electron beam or laser beam welding.

We claim:

1. A method for manufacturing a two-piece piston for internal combustion engines, including a head having dependent therefrom a pair of pin bosses for bearing a piston wrist pin, and a skirt portion, comprising the steps of:

forming a top portion comprising a circular upper plate and a substantially cylindrical leg depending from a periphery of said plate, said circular plate having an outer face and an inner face;

forming a U-shaped pin boss portion, said boss portion including a base having ends and a pair of arms respectively connected at opposite ends of said base, said arms having holes for a wrist pin, the distance between said arms being less than the diameter of said top portion;

positioning the base of said boss portion within said cylindrical leg;

welding said base to said inner face of said top portion; and machining at least a portion of said substantially cylindrical leg and said wrist pin holes.

2. The method as defined in claim 1, wherein the welding of the top portion to said base comprises friction welding said top portion to said base.

3. The method as defined in claim 1, wherein the pin boss portion includes a hole in said base.

4. The method as defined in claim 1, including obtaining at least one of the top portion and the pin boss portion by one of cold forming a plate and hot forming a plate.

5. The method as defined in claim 1, including obtaining at least one of the top portion and the pin boss portion by performing a casting process.

6. The method as defined in claim 1, including obtaining at least one of the top portion and the pin boss portion by performing a sintering process.

7. The method as defined in claim 1, including making the top portion and the pin boss portion independently from material selected from the group consisting of steel, cast iron and aluminum.

8. The method as in claim 1, wherein said step of forming a top portion includes the further step of deep drawing a metal plate.

9. The method as in claim 1, wherein said step of forming a U-shaped pin boss portion includes the further step of bending a flat plate with holes therein into said U-shape.

* * * * *